Figure 1:
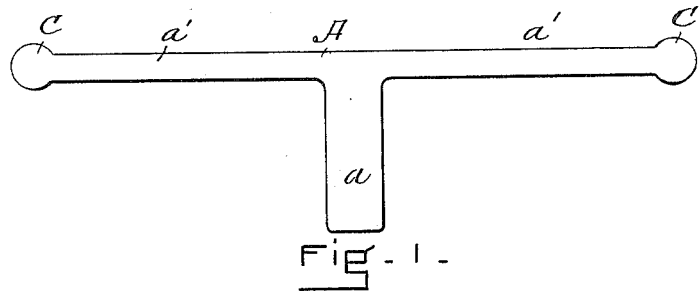

(No Model.)

R. G. HOPKINS.
TYPE WRITER RIBBON HOLDER.

No. 599,504. Patented Feb. 22, 1898.

WITNESSES
J. W. Dolan.
L. A. Walsh.

INVENTOR
Robt. G. Hopkins
by his attys
Clarke & Raymond

THE NORRIS PETERS CO., PHOTO-LITHO., WASHINGTON, D. C.

UNITED STATES PATENT OFFICE.

ROBERT G. HOPKINS, OF SOMERVILLE, MASSACHUSETTS.

TYPE-WRITER-RIBBON HOLDER.

SPECIFICATION forming part of Letters Patent No. 599,504, dated February 22, 1898.

Application filed September 28, 1896. Serial No. 607,163. (No model.)

*To all whom it may concern:*

Be it known that I, ROBERT G. HOPKINS, a citizen of the United States, residing at Somerville, in the county of Middlesex and State of Massachusetts, have invented a new and useful Improvement in Type-Writer-Ribbon Holders, of which the following is a full, clear, and exact description, reference being had to the accompanying drawings, forming a part of this specification, in explaining its nature.

Type-writer ribbons to a considerable extent are prepared for sale by being wound upon a spool, and in applying it to the type-writing machine its end is attached to the reel of the machine and wound thereon, unwinding at the same time from the spool. It is desirable while the ribbon is thus being unwound from its spool that the spool be readily attached to the type-writing machine or some other support in suitable proximity to the receiving-reel of the machine, and it is also desirable that such means be simple and cheap, so that it may be marketed with the spool and ribbon.

My invention is illustrated in the drawings, wherein—

Figure 2:
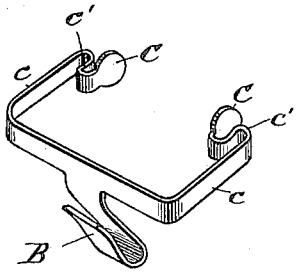
Figure 3:
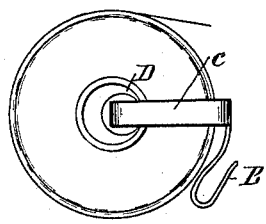
Figure 4:
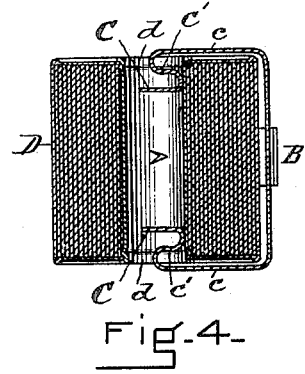
Figure 5:
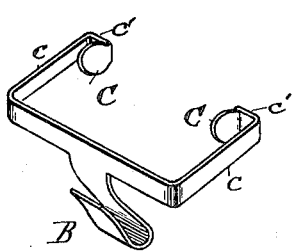

Figure 1 is a view in plan of the blank from which the holder is made. Fig. 2 is a view in perspective of the complete holder. Fig. 3 represents it as applied to a spool, shown in side elevation. Fig. 4 is a view in central section through the spool and holder. Fig. 5 represents a slight modification.

Referring to the drawings, A represents a metal blank from which the holder is made. The tongue $a$ of this blank is bent to form a hook or clamp B, by which the holder is attached to the machine or other suitable support. The arms $a'$, extending from the tongue, preferably have the circular ends C, which are disposed opposite to each other by bending the arms to form the sections $c$, which are parallel with each other, and the curved or S-shaped bends $c'$ between the ends of these parallel sections and the circular ends C. The arms have a yielding relation in respect to each other, and the ends C are adapted to enter the opposite ends $d$ of the ribbon-spool D, being sprung into place and held therein by the spring of the said arms. The circular ends form bearings within the bore of the spool upon which the spool may be turned, they being so supported in relation to the arms as to form the bearings for the spool.

The connection between the ends of the arms $c$ and the bearing-pieces C may not be S-shaped, but may be direct or shaped as represented in Fig. 5.

It will be seen that by making the bearing ends C curved or round and opposed to each other they take the place of a continuous round bearing and are the equivalent therefor.

Having thus fully described my invention, I claim and desire to secure by Letters Patent of the United States—

As an improved article of manufacture, the holder for spools of type-writer ribbons herein described formed from the T-shaped metal blank A, the said holder having the hook B for attachment to a type-writer, the parallel sections $c$, the curved bends $c'$ and the circular bearing-pieces C.

ROBERT G. HOPKINS.

Witnesses:
F. F. RAYMOND, 2d,
J. M. DOLAN.